Figure 1:
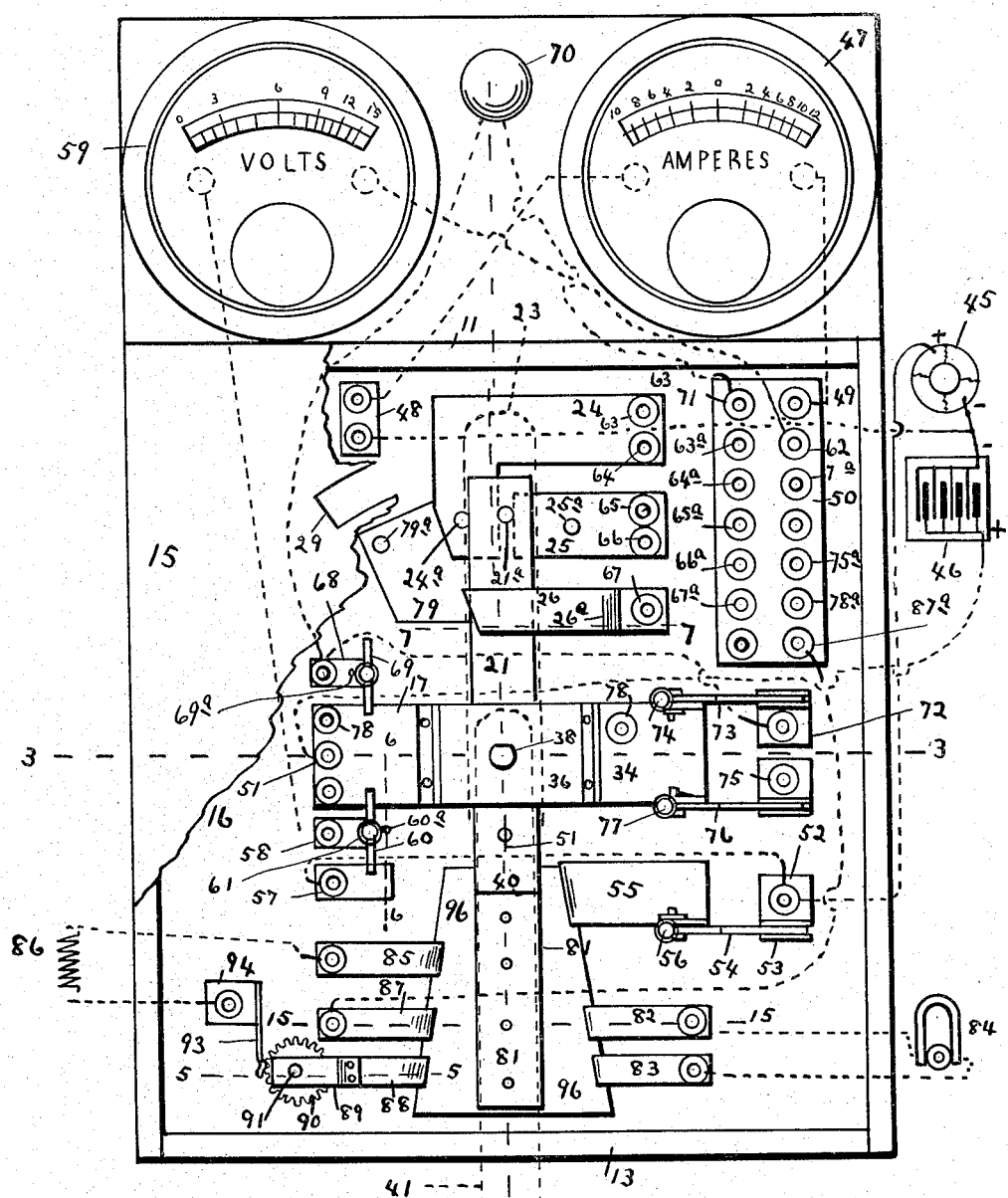

M. H. JOHNSON.
ELECTRICAL SWITCH.
APPLICATION FILED DEC. 26, 1911. RENEWED NOV. 3, 1914.

1,174,162.

Patented Mar. 7, 1916.
3 SHEETS—SHEET 1.

WITNESSES:
Harriet Williams.
Ethel Butterworth.

INVENTOR
Montgomery H Johnson
BY Martin & Jones
ATTORNEYS

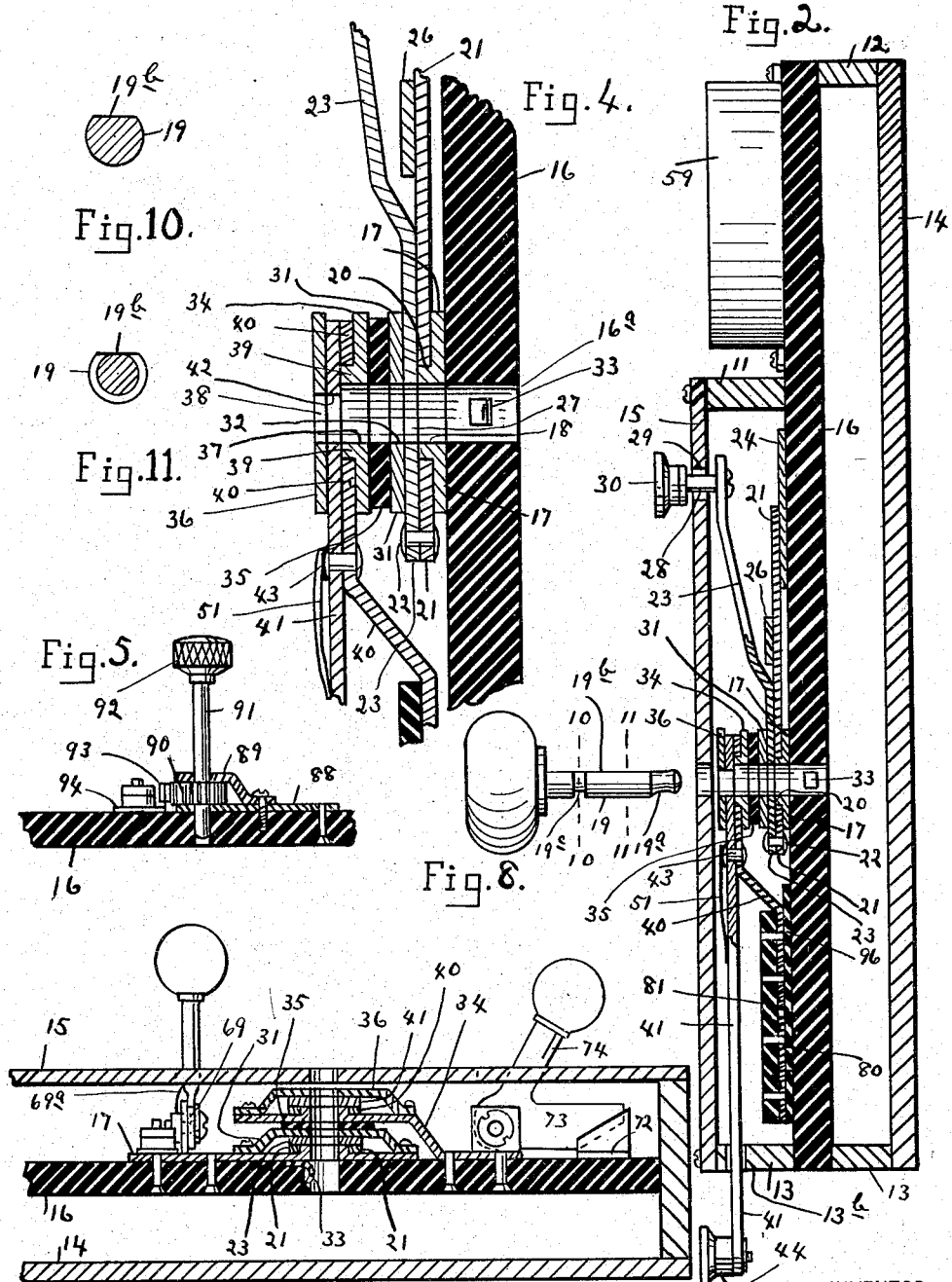

M. H. JOHNSON.
ELECTRICAL SWITCH.
APPLICATION FILED DEC. 26, 1911. RENEWED NOV. 3, 1914.

1,174,162.

Patented Mar. 7, 1916.
3 SHEETS—SHEET 3.

WITNESSES:
Harriet Williams
Ethel Butterworth

INVENTOR
Montgomery H. Johnson
BY Martin & Jones
ATTORNEYS

UNITED STATES PATENT OFFICE.

MONTGOMERY H. JOHNSON, OF UTICA, NEW YORK.

ELECTRICAL SWITCH.

1,174,162. Specification of Letters Patent. Patented Mar. 7, 1916.

Application filed December 26, 1911, Serial No. 667,661. Renewed November 3, 1914. Serial No. 870,170.

*To all whom it may concern:*

Be it known that I, MONTGOMERY H. JOHNSON, of Utica, in the county of Oneida and State of New York, have invented certain new and useful Improvements in Electrical Switches; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to electrical switches and switch boards. While it is particularly adapted for use in the control of the electric lighting service and electrical ignition in connection with gas or gasolene engines in automobiles and motor boats and illustrated herein in connection with an automobile, the invention may be used in various places where more or less similar problems are encountered.

One object of my invention is to provide an electrical switch wherein a removable plug serves to render mechanically operative the connection between the switch lever and the contact arm, so that movement of the lever when the plug is not in place produces no movement of the contact arm.

A further object is to use one plug to render mechanically operative more than one switch; or to render more than one switch mechanically inoperative by the removal of said plug.

Another object is to so construct the switch board that with the plug in place the proper movement of the contact arm may complete the circuits, but a similar movement of the contact arm will not complete the circuits if the plug is not in place. By reason of this double control through the plug, I am able to doubly safeguard against accidental electrical connections. Also I am able to use the plug to make electrical connection for some circuits by its mere insertion and at the same time use the plug in its usual double way as to other circuits.

Another object is to use one plug as a necessary part of one or one series of circuits and as a locking element to render operative the switch controlling those circuits or other circuits, or both.

One of the objects to be obtained by my invention is a switchboard of such construction that different parts of the lighting system may be used as desired and the ignition current may be taken from the magneto, or from the storage battery, or from the storage battery and dynamo. The current from the storage battery and dynamo can be indicated by the voltmeter and ampere meter when desired.

It will be understood also that the arrangement of the ignition switch and the switchboard is such that only one of the ignition circuits can be in operation at one time by reason of the fact that a single contact arm is a necessary part of both circuits, so that when it is moved to complete one circuit it is removed from the other circuit; there is also a neutral position for this contact arm in which position both circuits are broken.

Provision is also made to charge the storage battery and test the same by voltmeter and ampere meter, and to disconnect the dynamo from the storage battery when desired.

Another object is to provide a switchboard where the movement of one lever operates to close the ignition circuit from the magneto, and also to connect the dynamo to the storage battery, while a reversal of the lever will break the ignition circuit from the magneto and also disconnect the battery from the dynamo. In this way I provide for normally charging the battery during running of the engine and also prevent the battery from discharging through the dynamo when the engine is not running. Of course independent means are provided for breaking the circuit from the dynamo to the battery so the latter will not be injured nor current wasted by overcharging.

A further object is to so arrange the switchboard that the plug cannot be withdrawn except when the ignition and charging switch has been moved to neutral position; and to make the lever of the ignition and charging switch act as a lock to prevent the withdrawal of the plug, except when this switch lever is in neutral position.

My invention provides for all the above objects and others that will appear hereafter, and also supplies proper means for the control of the various parts in needed combinations and yet safeguards against improper interference.

The drawings illustrate my invention as applied to a switchboard on the dashboard of an automobile, the switchboard being in a substantially perpendicular position.

Figure 1 is a general plan view of an electrical switchboard embodying my invention, the cover being largely broken away and the different handles being removed, and the two main levers being shown only in dotted lines. Fig. 2 is a perpendicular section view on line 2—2 of Fig. 1. Fig. 3 is a horizontal sectional view on line 3—3 of Fig. 1. Fig. 4 is a perpendicular sectional view on line 2—2 of Fig. 1 of the parts adjacent the plug holes on an enlarged scale. Fig. 5 is a horizontal sectional view on line 5—5 of Fig. 1. Fig. 6 is a perpendicular sectional view on line 6—6 of Fig. 1. Fig. 7 is a horizontal sectional view on line 7—7 of Fig. 1. Figs. 8 and 9 are side and top views respectively of the plug; and Figs. 10 and 11 are cross-sectional views thereof on lines 10—10 and 11—11 respectively of Fig. 8 on an enlarged scale. Fig. 12 is a front plan view of the switch lever of the lighting switch. Fig. 13 is a front plan view of the switch lever of the ignition and battery charging switch. Fig. 14 is a front plan view of a modified form of the contact plate. Fig. 15 is a horizontal sectional view on line 15—15 of Fig. 1.

The switchboard is housed within a box or casing of convenient size consisting of top pieces 11 and 12, bottom 13, removable back 14 and removable front cover 15, and a perpendicular partition 16, which is of wood or other insulating material and divides the box into two compartments. In the front compartment is mounted on the partition 16 as a base the various parts of the switchboard, while the back compartment serves as a convenient chamber for carrying the various wires to the parts of the switchboard to which they are connected for which purpose it will be understood holes will be made in the partition or base 16 where desired.

Secured upon the central part of the base 16 is the inner conducting pivoting plate 17. This plate has round hole 18 therethrough adapted to receive the plug 19, and around the hole is an annular flange 20 upon which is pivoted the movable contact arm 21 to which a little below the flange 20 is pivoted by pin 22 the lower end of the lighting switch lever 23. The contact arm 21 extends upwardly far enough to be swung into contact with side lights contact plate 24, head lights contact plate 25, and tail light contact plate 26, all of which are secured to the base 16 in any convenient manner. The lighting switch lever 23 extends upwardly from its pivoted connection with the contact arm, over the hole 18 in the conducting plate 17, at which point there is provided a similar round hole 27 adapted to receive the plug 19 and to be in line with the hole 18 when the lever 23 is in alinement with contact arm 21, as indicated in dotted lines in Fig. 1. The upper end of the lighting lever 23 is provided with a pin 28 which projects through an opening 29 in the front cover 15 and then receives a suitable handle 30. A strap or bridge 31 is mounted on the conducting plate 17 to keep the lever 23 and contact arm 21 in position, while a round hole 32 in the bridge 31 in line with the hole 18 in the conducting plate 17 admits the plug 19 and holds it against side movement.

The plug 19 has its body of conductive metal and with the exception of its upper side, which is flattened for purposes hereinafter mentioned, the plug is circular in cross-section to afford ample electrical contact surface with the parts through which it extends, and to afford an easy but close fitting pivot for the parts pivoted thereon. Near the point end of the plug shank an encircling groove 19ª affords means for engagement by a spring catch 33 located in an opening 16ª in the base 16 when the plug has been placed in the switch.

The mechanical operation of the switch thus far described will be as follows: When the plug 19 is not in place movement of the lever 23 by its handle 30 will simply move the lever from side to side with the pin 22 as its pivoting point, but will be inoperative to move the contact arm 21 as the lever 23 and arm 21 though side by side have only one fastening point common to both and that is a loose pivoting fastening. It will be understood, of course, that the contact arm 21 has sufficient friction against the contact plates 24, 25 and 26 to prevent the friction of the adjacent lever 23 from moving the contact arm 21.

It will be obvious therefore that unless the plug 19 is in place, movement of the lever 23 will be inoperative to move the contact arm 21 from its former position. When the plug is inserted in the switch it will be seen that the plug will act as a lock holding the lever 23 and contact arm 21 in line at another or second point, and so locking the contact arm to the lever and causing them to swing together around the plug 19 as a pivot and thereby causing the upper end of the contact arm 21 to move in the same direction and to the extent that the lever 23 is moved.

As far as the switch now described is concerned, the plug 19 can be removed when the lever 23 and contact arm 21 are in any position and can be inserted again when those parts are in any position in alinement with each other. If the lever has been moved since the removal of the plug, the parts can be brought into alinement by pushing in the plug as far as it will go, that is, until it strikes the lever 23 and then moving the handle back and forth until the hole 27 is found by gentle pressure upon the plug; but this trial proceeding will rarely be necessary as the operator will usually remember the position of the switch and under normal circumstances the position of the switch will be indicated by the lights.

Secured to the base 16 to the right of the conducting plate 17 is the stationary conducting pivoting plate 34. This plate extends to the left over the plug holes of the lighting switch parts, but not in electrical contact therewith, being insulated therefrom by suitable insulation block 35 which prevents the two conducting plates from being accidentally forced together. Through this conducting plate 34 is a round hole 37 in alinement with the plug holes in the other conducting plate 17, and adapted likewise to receive the plug 19. Surrounding the hole 37 in the conducting plate 34 is an annular flange 39 about which is pivoted the swinging contact arm 40 of this switch, between which and the bridge 36 secured to plate 34 is the lever 41 for this switch having plug hole 42 therein. A little distance down from the plug holes the lever 41 and contact arm 40 are loosely pivoted to each other by pin 43. The lever 41 extends downwardly through slot 13$^b$ to a point without the switch box where it receives a handle 44. Below pivoting pin 43 the contact arm is bent toward the base 16 and then extends downwardly parallel thereto in order to make contact with various contact plates secured to the base 16 to either side of a middle position, as will be fully described hereafter.

The plug hole 38 in the bridge 36 is not round like all the plug holes in its conducting plate 34, the conducting plate 17 and its bridge 33, but is D-shaped to closely fit the upper flattened side 19$^b$ of the plug 19. This arrangement prevents the plug 19 from rotating when in place and in that way lessens the tendency of the plug to work loose upon the operation of the different switches. Its main purpose, however, is to hold the plug from being rotated and thereby form part of a locking device which prevents the plug itself from being withdrawn except when the ignition and charging switch lever 41 is in neutral position. The plug hole 42 in this lever 41 is also D-shaped to fit the flattened shank of the plug but at the part of the plug shank that is encircled by the lever 41 when the plug is in place, there is provided an annular groove 19$^c$ of such depth that the lever 41 may freely swing around the plug 19, notwithstanding the D-shaped hole 42 in the lever 41. As soon, however, as the lever 41 is swung from its middle or neutral position the flat side of the hole 42 will enter the groove 19$^c$ of the plug and will, therefore, prevent the removal of the plug so long as this ignition and charging switch is in either operative position. In this way the operator is obliged to move the ignition and charging switch from either operative to its neutral position before the plug 19 can be withdrawn. It will also be obvious that the contact arm 40 of this switch will be mechanically inoperative upon movement of the switch lever 41, except when the plug 19 is in place. A spring 51 secured to pin 43 and to lever 41 serves to bring the lever back into alinement with contact arm 40 when the lever is moved without the plug in place, and so insures the plug hole 42 being in place to receive the plug in whatever position the switch has been left.

It will be noted that I have made a construction wherein a single plug serves to mechanically lock into operative connection a series of two or more switches either of which may be operated independently of each other, and yet the withdrawal of the one plug will render both inoperative, for the reason that the one plug is the common pivot of both switches in each of which the lever and contact arm are pivotally connected to each other at a point other than their pivoting point during operative connection.

Negative terminals of direct current dynamo 45 and storage battery 46 are connected together on one side and jointly connected to one terminal of ammeter 47 through binding posts on plate 48 within the switchboard. The other terminal of the ammeter 47 is connected to binding post 49 on the omnibus plate 50. The positive terminal of the storage battery is connected at binding post 51 to the inner conducting and pivoting plate 17, which is at all times in electrical connection with contact arm 21 pivotally mounted thereupon. The positive terminal of the dynamo 45 is connected to plate 52, which has socket 53 to receive the blade of knife switch 54, which is mounted upon and in connection with contact plate 55 upon the right side of the base 16 and which switch 54 operated by handle 56 extending through an opening in the front cover 15. Plate 52 is also connected to plate 57 upon the left of the base and below and a little distance from the left end of the inner conducting plate 17. Interposed between this plate 57 and the conducting plate 17 is a plate 58 connected to one terminal of the voltmeter 59 and upon this plate 58 is a rocking switch 60 adapted to be rocked on its lower side into contact with plate 57, or on its upper side into contact with conducting pivoting plate 17. This switch is normally held out of contact with either of its said contact plates by spring 60$^a$ but is manually operated by a handle 61 extending through the front cover 15. The other terminal of the voltmeter is connected to binding post 62 upon the omnibus plate 50. Between binding post 63 and 64 on the side lights, contact plate 24, and binding posts 63ª and 64ª on omnibus plate 50 respectively, are interposed by suitable wiring the side lights (not shown). Between binding posts 65 and 66 on head lights contact plate 25 and posts 65ª and 66ª on the omnibus plate 50 are interposed the head lights (not shown). Between post 67 on the tail light contact plate 26 and post 67ª on the omnibus plate is interposed the tail light (not shown).

Above the left end of conducting pivoting plate 17 is a small plate 68 capable of being brought into connection with plate 17 by means of a rocking switch 69 on plate 68 but normally held out of such contact by spring 69ª.

Plate 68 is connected to dash or pilot light 70, which in turn is connected to the omnibus plate 50 by post 71. Plate 68 is also connected to plate 72 located on the base 16 to the right of upper conducting pivoting plate 34. This plate 72 has sockets to receive knife switch 73 which is secured to and in electrical connection with the plate 34. Knife switch 73 is operated by handle 74 extending out through the front cover 15 of the switchboard. Another plate 75 is located to the right of conducting plate 34 and connected to plate 34 by means of knife switch 76 secured to plate 34 and controlled by handle 77 extending without the front cover 15. A tonneau light or other light may be interposed between plate 75 and post 75ª on the omnibus plate.

Between post 78 on the inner conducting pivoting plate 17 and post 78ª on the omnibus plate may be interposed a cigar lighter (not shown), to which it will be seen battery current will be supplied without the plug 19 being in place, and, of course, without regard to position of either switch lever.

As will be seen in Fig. 1 the shape and arrangement of the lighting switch contact arm and contact plates 24, 25 and 26 is such that when the contact arm is in upright position, contact will be made to all three of these plates thereby lighting the side lights, head light and tail light. In this position a slight projection from the rear of contact arm 21 conveniently formed by stamping a recess 21ª into the front of the contact arm, rests in the depression between the right side of the L-shaped portion of plate 24 and the left side of plate 25. When the contact arm 21 is swung part way to the left, its contact with head lights contact plate 25 is lost, but is retained as to side lights plate 24 and tail lights plate 26. In this position the rearward projection on contact arm 21 engages recess 24ª in the L-shaped portion of plate 24. Upon moving contact arm 21 farther to the left its connection with plates 24 and 26 is broken and the projection 21¹ engages a depression 78ª in an insulation block 79 immediately to the left of and of the same thickness as plate 24. This block keeps the contact arm on a line with the contact plate 24 and allows the contact arm to be easily and surely swung back onto plate 24. The engagement of the rearward projection of contact arm 21 in the different recesses mentioned at its different positions holds the contact arm securely in place against vibration of the machine and against any tendency to motion with the lever 23 when the plug is removed, but as the projection and recesses have slanting sides the arm 21 can be easily moved when operatively connected to the lever 23 by plug 19. The engagement of the projection with these depressions also indicates to the operator's hand when desired positions have been reached when moving lever 23.

To secure good contact pressure to all the plates engaged by contact arm 21, I have contact plates 24 and 25 lie flat against the base 16, but contact arm 26 while secured to base 16 at its right end has its left end raised thereabove so as to make contact with the outward surface of the contact arm 21 and thereby hold it securely against the plates 24 and 25 back of the arm 21. A loop 26ª in contact plate 26 tends to give it greater resiliency for this purpose.

As will be shown more particularly in Fig. 2 the pivoted contact arm 40 extends only a short distance below contact plate 55 and is then replaced by an extension contact arm 80 mechanically connected in alinement with arm 40 but electrically insulated therefrom by a strip 81 of suitable insulating material.

Spaced apart side by side on the base 16 and to the right of the middle or neutral position of extension contact arm 80 are contact plates 82 and 83, which are so connected as to be two terminals of the ignition circuit from the magneto 84. To the left of middle or neutral position of contact arm 40 and below plate 57 there is located on the base 16 a contact plate 85 connected to one pole of the battery coil 86 of the battery ignition circuit.

Below contact plate 85 and to the left of contact arm 80 when at its middle or neutral position are located upon the base 16 but spaced apart thereon two contact plates 87 and 88. Plate 87 is connected to omnibus plate 50 at post 87ª. Plate 88 has mounted thereon by means of bracket 89 a spurred wheel 90 on shaft 91 revolving in plate 88 and bracket 89, and having its forward end extended out through the front cover 15 of the switchboard and there provided with a handle 92 suitable to rotate said spurred wheel by the hand of the operator. A spring tension contact arm 93 projecting from a small plate 94 conveniently located upon the base 16 and connected to the other pole of the battery coil 86, normally makes contact with the spurred wheel 90, but has its contact sufficiently interrupted by rotation of said spurred wheel to induce the necessary secondary current through battery coil 86 for the ignition circuit for the engine.

As there is difficulty in getting the swinging contact arm 40 to make effective contact with plates 55 to the right or 85 to the left, and in getting extension contact arm 80 to make effective contact with plates 82 and 83 to the right or 87 and 88 to the left by reason of the number of contacts to be made at one time by such a swing switch, I form, as indicated particularly in Fig. 15, all these contact plates of resilient material and shaped to curve outwardly at their central portion, which will be the part that will come under the contact arms, while their ends farthest from the contact arms are secured to stiff plate 95 placed below said resilient plates. The ends of said resilient plates toward the contact arms slope back over the adjacent ends of the underlying plates 95 and extend loosely beneath an insulating mat 96, which is located in the space between the right and left series of these contact plates to enable the contact arms 40 and 80 to be freely moved onto either the right or left series of these plates, and also to hold said contact arms in neutral position by the slight friction between said mat and said contact arms. It will now be seen that each of these resilient contact plates will spring outwardly enough to make its own contact with the contact arm moved thereover.

Bearing in mind the mechanical and electrical constructions and connections hereinbefore detailed, it will be evident that the operation of the switchboard will be as follows: Assuming the engine to be stopped, the plug 19 must first be inserted to make the ignition and charging switch lever 41 operative, then that lever is swung from its middle or neutral position to the left whereupon the battery coil ignition circuit is closed by the two contacts so formed: the first, between plate 85, which is in direct connection with the battery coil, and the swinging contact arm 40 which is in connection with the upper pivoting and conducting plate 34 and thereby in connection successively with plug 19, lower pivoting plate 17 and positive terminal of the storage battery; the second, between plates 88 and 87 by means of the extension contact arm 80, as the plate 88 is connected through the interrupting wheel 90 to the other terminal of the battery coil, while plate 87 is connected through omnibus plate 50 to the negative pole of the storage battery. The two contacts so made operate as the closure of a double pole switch to complete the ignition circuit from the battery coil. In a nonvibrating coil the necessary interruption of the current is obtained by the operator rotating spurred wheel 90, and the ammeter 47 indicates if current is flowing through the battery coil. The voltage of the storage battery may now be tested by raising the handle 61 of the rocking switch 60 whereby one side of this switch is brought into contact with the inner pivoting plate 17.

Upon the engine and the dynamo 45 being started, the ignition and charging switch lever 41 is swung over to its right hand position to make the ignition circuit from the magneto 84 complete by the connection made between the two terminals thereof, viz: contact plates 82 and 83 by means of extension contact arm 80. The same movement of this switch lever has also moved contact arm 40 onto plate 55 and assuming switch 54 to be closed, the dynamo will at once be put in connection with and begin to charge the storage battery 45, connection being made from switch 54 to plate 52 and thence direct to the positive terminal of the dynamo; while from plate 55 connection is made through contact arm 40, upper pivoting plate 34, plug 19, lower contact plate 17, which is connected to the positive pole of the storage battery 46. The voltage may now be indicated by pressing down the handle 61 of rocking switch 60, which then makes contact with plate 57, which is in connection with plate 52, which in turn is in direct connection with the positive terminal of the dynamo 45. When desired the charging of the storage battery 46 may be discontinued by opening switch 54, which has no effect on the magneto circuit while leaving contact arm 40 still in contact with plate 55. The battery may then be further charged by closing switch 54.

The magneto circuit is broken by moving lever 41 and therewith contact arm 80 to the middle or neutral position, which movement of lever 41 also breaks the contact between plate 55 and contact arm 40 and thereby breaks the circuit between the storage battery and the dynamo, which prevents the battery from discharging through the dynamo.

With the locking device formed by the D-shaped hole in lever 41, the plug 19 cannot be removed unless the lever 41 is brought to its neutral position and, therefore, the operator in order to remove the plug must bring the lever 41 to such position that the circuit from the storage battery through the dynamo is also broken.

A modified form of my invention is to construct the dynamo contact plate 55 which is in connection with one terminal of the dynamo, of such shape that it will make contact with contact arm 40 both when that arm is swung to the right as heretofore described and as shown particularly in Fig. 1, and also when said contact arm 40 is swung to the left but not when the contact arm is in its middle position. Such a modified form of plate 55 is shown in Fig. 14 in which to the original shape of the plate is added a contact plate 55ª to the left of middle position of contact arm 40 and an arm 55ᵇ electrically connecting said plate 55 and its left hand portion 55ª, but so arranged toward the top that the contact arm will not touch said arm 55ᵇ when the contact arm is at neutral position. With this modified form of contact plate 55, it will be seen that when the arm 40 is moved to its right hand position the magneto ignition circuit will be operative and the dynamo will be connected to charge the battery as already described; that when the contact arm is moved to its left hand position the ignition circuit from the storage battery will be closed as before shown and also that the dynamo will be connected through plate 55ª to charge the storage battery while at the neutral position of the contact arm when neither ignition circuit is closed, the connection between the dynamo and storage battery will also be broken thus preventing the storage battery from discharging into the dynamo when the engine is not running. By swinging arm 21 to right of perpendicular it engages recess 25ª in plate 25 and makes contact only with side light plate 25 and tail light plate 26 thereby lighting only the side lights and tail light.

What I claim as new and desire to secure by Letters Patent is:

1. In an electrical switch, a pivoting conducting plate, a contact plate spaced therefrom, a contact arm pivoted to said pivoting plate, and adapted to be swung into contact with said contact plate, a switch lever pivotally connected to said contact arm and removable means connecting said switch lever and contact arm at a point other than their said pivotal connection whereby said arm is locked to movement with said lever only when said removable connection is in place.

2. In an electrical switch a pivoting conducting plate, a contact plate spaced therefrom, a contact arm pivoted to said pivotal plate and adapted to be swung into contact with said contact plate, a switch lever pivotally connected to said contact arm at a point other than its connection with said pivoting plate and removable means connecting said switch lever and contact arm at a point coinciding with the axis of the pivotal connection between said pivotal plate and said arm whereby said arm is locked to movement with said lever only when said removable connection is in place.

3. In an electrical switch, a conducting plate having a plug hole therein, a flange on said plate surrounding said plug hole, a contact plate spaced from said conducting plate, a contact arm pivotally mounted on said flange and adapted to be swung into contact with said contact plate, a switch lever pivotally connected to said contact arm at a point other than its pivotal connection with said conducting plate and having a plug hole adapted to be brought into line with the plug hole in said conducting plate, and a removable plug adapted to be inserted in said plug holes when in alinement and lock said contact arm to movement with said lever.

4. In an electrical switch, a conducting plate having a plug hole therein, a flange on said plate surrounding said plug hole, a contact plate spaced from said conducting plate, a contact arm pivotally mounted on said flange and adapted to be swung into contact with said contact plate, a switch lever pivotally connected to said contact arm at a point other than its pivotal connection with said conducting plate, and a plug hole adapted to be brought into line with the plug hole in said conducting plate, a removable plug adapted to be inserted in said plug holes when in alinement and lock said contact arm to movement with said lever and means preventing the removal of said plug except when said lever and contact arm are in a predetermined position.

5. In an electrical switch board a plurality of superimposed conducting plates, a plurality of contact plates spaced therefrom, a contact arm pivoted to each of said conducting plates with their axes in alinement and adapted to be swung into contact with their respective contact plates, a switch lever pivotally connected to each of said contact arms at a point other than at its connection with said pivotal plate and a single removable plug of conductive material inserted through all said switch levers and contact arms at a point coinciding with the axis of the pivotal connection between said pivotal plates and said arms whereby said arms are locked to movement with their respective levers and said conducting plates are electrically connected only when said removable plug is in place.

6. In an electrical switch a pivoting conducting plate, a contact plate spaced therefrom, a contact arm pivoted to said pivotal plate and adapted to be swung into contact with said contact plate, a switch lever pivotally connected to said contact arm at a point other than its connection with said pivoting plate and a removable plug adapted to be inserted through said switch lever and contact arm at a point coinciding with the axis of the pivotal connection between said pivotal plate and said arm whereby said arm is locked to movement with said lever only when said plug is in place and means preventing the removal of said plug except when said lever and contact arm are in a predetermined position.

7. In an electrical switch board, a plurality of superimposed pivoting conducting plates, a plurality of contact plates spaced therefrom, a contact arm pivoted to each of said pivotal plates with their axes in alinement and adapted to be swung into contact with their respective contact plates, a switch lever pivotally connected to each of said contact arms at a point other than its connection with its said pivoting plate, a single removable plug inserted through all said switch levers and contact arms at a point coinciding with the axis of the pivotal connection between said contact plates and said arms whereby said arms are locked to movement with their respective levers only when said plug is in place and means adapted to prevent the removal of said plug except when one of said levers and its arm are in a predetermined position.

8. In an electrical switch board a plurality of superimposed, individually insulated conducting plates, a plurality of contact plates spaced therefrom, a contact arm pivoted to each of said conducting plates with their axes in alinement and adapted to be swung into contact with their respective contact plates, a switch lever pivotally connected to each of said contact arms at a point other than at its connection with said pivotal plate, a single removable plug of conductive material inserted through all said switch levers and contact arms at a point coinciding with the axis of the pivotal connection between said pivotal plates and said arms whereby said arms are locked to movement with their respective levers and said conducting plates are electrically connected only when said removable plug is in place and means adapted to prevent the removal of said plug except when one of said levers and its arm are in a predetermined position.

9. In an electrical switch, a contact plate, a contact arm adapted to be swung into contact with said contact plate, a switch lever pivotally connected to said contact arm and removable means connecting said switch lever and contact arm at a point other than their said pivotal connection whereby said arm is locked to movement with said lever only when said removable connection is in place.

10. In an electrical switch, a pivoting plate, a contact plate, a contact arm pivoted to said pivoting plate and adapted to be swung into contact with said contact plate, a switch lever pivotally connected to said contact arm at a point other than its connection with said pivoting plate and removable means connecting said switch lever and contact arm at a point other than their said pivotal connection whereby said arm is locked to movement with said lever only when said removable connection is in place.

11. In an electrical switch a pivot, a contact plate, a contact arm pivoted to said pivot and adapted to be swung into contact with said contact plate, a switch lever pivotally connected to said contact arm at a point other than its connection with said pivot and removable means connecting said switch lever and contact arm at a point coinciding with the axis of the pivoting connection between said pivot and said arm whereby said arm is locked to movement with said lever only when said removable connection is in place.

12. In an electrical switch board, a plurality of superimposed pivoting plates, a plurality of contact plates, a contact arm pivoted to each of said pivotal plates with their axes in alinement and adapted to be swung into contact with their respective contact plates, a switch lever pivotally connected to each of said contact arms at a point other than its connection with its said pivoting plate and a single removable plug inserted through all said switch levers and contact arms at a point coinciding with the axis of the pivotal connection between said contact plates and said arms whereby said arms are locked to movement with their respective levers only when said plug is in place.

In witness whereof I have affixed my signature, in the presence of two witnesses, this 19th day of December 1911.

MONTGOMERY H. JOHNSON.

Witnesses:
HARRIET WILLIAMS,
JAMES H. MERWIN.

Copies of this patent may be obtained for five cents each, by addressing the "Commissioner of Patents, Washington, D. C."